United States Patent [19]

Husbands et al.

[11] Patent Number: 4,781,427

[45] Date of Patent: Nov. 1, 1988

[54] ACTIVE STAR CENTERED FIBER OPTIC LOCAL AREA NETWORK

[75] Inventors: Charles R. Husbands, Acton; Bruce D. Metcalf, Carlisle, both of Mass.

[73] Assignee: The MITRE Corporation, Bedford, Mass.

[21] Appl. No.: 777,934

[22] Filed: Sep. 19, 1985

[51] Int. Cl.[4] ............................................. G02B 6/28
[52] U.S. Cl. .................................. 350/96.16; 455/612
[58] Field of Search ..................... 350/96.15, 96.16; 455/600, 601, 606, 607, 612

[56] References Cited

U.S. PATENT DOCUMENTS

| | | | |
|---|---|---|---|
| 4,227,260 | 10/1980 | Vojvodich et al. | 455/601 |
| 4,528,695 | 7/1985 | Khoe | 455/612 |
| 4,573,215 | 2/1986 | Oates et al. | 455/607 |
| 4,580,872 | 4/1986 | Bhatt et al. | 350/96.16 |

Primary Examiner—Eugene R. Laroche
Assistant Examiner—Steven J. Mottola
Attorney, Agent, or Firm—Wolf, Greenfield & Sacks

[57] ABSTRACT

The local area optical network interconnects a plurality of user terminals. The local area network includes an interface unit for receiving information from the user terminals and an active star node connected to the interface unit by fiber optic cables. In one embodiment, the active star centered node includes a passive optical star coupler having a plurality of ports for interconnecting the terminals. An optical receiver receives optical signals from the star coupler and is interconnected with an optical transmitter which transmits the signal from the receiver back into the star for distribution to the plurality of ports. In either embodiment, the star node includes an expansion port and an optically associated transmitter and receiver to allow multiple nodes to be connected to one another in an hierachial, branching architecture. In another embodiment, the active star centered node includes a passive input star coupler and a passive output star coupler. The local area networks organized around the active stars are portable, flexible and expandable.

10 Claims, 5 Drawing Sheets

ACTIVE STAR CENTERED FIBER OPTIC LOCAL AREA NETWORK

BACKGROUND OF THE INVENTION

The present invention relates to local area networks and more particularly to a local area network organized around a fiber optic active star node.

A local area network (LAN) for use in emergency command center communications should satisfy requirements for portability, flexibility and expandability. The portability requirement suggests that the LAN be lightweight, self-contained and rapidly deployable. In certain emergency situations, the command center may have to be relocated. In this case, the LAN must be retrieved, packed in a truck or helicopter for transport to the new site, and there rapidly deployed. The light weight and small size of fiber optics meet this portability requirement. In addition, a fiber optic medium offers well known benefits of immunity to electrical interference and lightning strikes, elimination of ground loops, and no catastrophic shorting in the event of a damaged cable section.

The requirement of LAN flexibility refers to the network's capability to support a wide variety of terminal devices for data services. Such flexibility may be provided by the utilization of standard electrical data interface units. In addition to data transmission, the distribution of one or more video channels is also desired for the transmission of images or maps to monitor the status of the emergency situation.

The requirement for expandability relates to the size of the LAN as measured by the number of terminal devices that may be interconnected by the network. The network must be balanced and should operate with various deployments ranging from a few to many subscriber stations. Furthermore, growth in the number of network subscribers should be modular. A dynamic reconfiguration to add additional subscribers to an operating network should not interfere with the communications between active terminals originally connected to the LAN.

It is therefore an object of the present invention to provide a local area network which is light in weight for portability.

Another object of the invention is a local area network capable of supporting a wide variety of terminal devices for data services.

Still another object of the invention is such a local area network which is expandable in a modular fashion to permit the interconnection of numerous terminal users.

SUMMARY OF THE INVENTION

The local area networks of the present invention are based on an active star node. In one embodiment, the active star node consists of a pair of passive, transmissive optical star couplers and active LED and PIN diode transmitter/receiver modules. In another embodiment a single active star centered node is utilized in a bidirectional fashion. The active star centered nodes of the present invention allow a modular expansion of the network, using an expansion port and provide auxiliary optical ports that can furnish vedeo distribution services and technical control access points.

BRIEF DESCRIPTION OF THE DRAWING

The invention disclosed herein will be understood better with reference to the following drawing of which.

DESCRIPTION OF THE PREFERRED EMBODIMENT

The network protocol selected for use with the local area network of the present invention is carrier sense multiple access (CSMA) with collision detection (CD). The CSMA protocol has evolved from decentralized contention techniques. This protocol is designed to support a large number of bursty users on a time shared transmission medium. This protocol features no central controller and any terminal can initiate communications to other terminals. To accomplish this task, the initiating terminal first listens to determine the availability of the transmission medium. If the line is quiet, the source terminal sends out a command packet followed by the message. The command packet contains both the destination address and the source address. Upon hearing its address, the receiving terminal copies the message. This process is termed "listen before talk" (LBT). In addition to the command packet containing the header information, additional packets are exchanged between the terminals to acknowledge valid receipt of the information.

Because of inherent delays in the transmission medium, two terminals located some distance from one another can initiate almost simultaneous transmissions based on each hearing a quiet line. This simultaneous transmission creates a collision on the line, producing garbled data. If simple LBT is employed, an invalid message can be detected through the use of check sums. Requests for retransmission of the invalid message can then be made through the acknowledgment process. As the transmission medium becomes more heavily loaded or the packet size is increased, the requirement for retransmission rapidly increases. To abort the transmission of an invalid packet upon detection of a collision, a technique called "listen while talk" (LWT) has been developed. The collision detection process can take several forms such as summed energy or software comparisons on the flags or addresses in the broadband mechanization.

In examining network structures to support the CSMA protocol with collision detection, the linear bus configuration known in the prior art (FIG. 1) appears to be a logical choice. This bus structure has been used successfully in coaxial mechanizations for both wideband and baseband data transmission in dual and single cable configurations. However, when this type of structure is mechanized in fiber optics, a series of problems become evident. One problem is the optical power loss associated with cascading couplers. As the losses increase linearly with the number of couplers involved, only a small number of terminals can be supported before repeaters are required.

Figure 1:
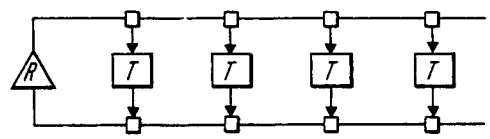
FIG. 1 is a prior art linear bus configuration.

A second problem associated with the linear bus configuration of FIG. 1 is the dynamic range requirements imposed on some of the optical receivers in the system. In FIG. 1, the optical receiver associated with the head-end repeater R must have the capability to rapidly adjust between optical signals received from the closest transmitter T and those from the most distant transmitter. To compensate for this process it is possible to engineer an optically balanced system by tapering the coupler tap ratios. Data bus designs successfully implementing this technique are known in the prior art. However, in a portable system repeatedly being disassembled and deployed, this tapering technique becomes impractical. Because of the requirements for modular expandability and portability, linear bus architecture is not suitable for use in the present invention.

Figure 2:
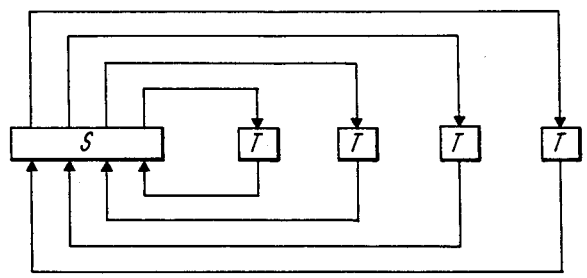
FIG. 2 is a prior art passive star coupler configuration.

The most popular method of mechanizing CSMA/CD fiber optic local area networks utilize the passive star coupler. The known passive star architecture is shown in FIG. 2 and uses a passive, transmissive star coupler as the key component. As is well known, a star coupler is an optical device which can combine and distribute optical signals. Such couplers are oftentimes constructed by wrapping optical fibers around one another so that light energy couples into each of the fibers. In the structure of FIG. 2, all of the optical transmitters are interfaced to one side of the star, while the optical receivers are connected to the opposite side of the star. The star acts as an optical combiner for the sources and then as an optical distribution network to the receivers. Since the optical loss of a star increases as the log of the number of ports, a greater number of terminals can be supported by this structure than by the linear bus of FIG. 1. Although the structure is inherently balanced, manufacturing variability in larger star couplers has caused dynamic range problems when collision detection is implemented. A major constraint on this type of architecture is expandability. Having once exceeded the limits of the original star node, the addition of star nodes through the use of repeaters is complicated by recirculation problems.

Figure 3:
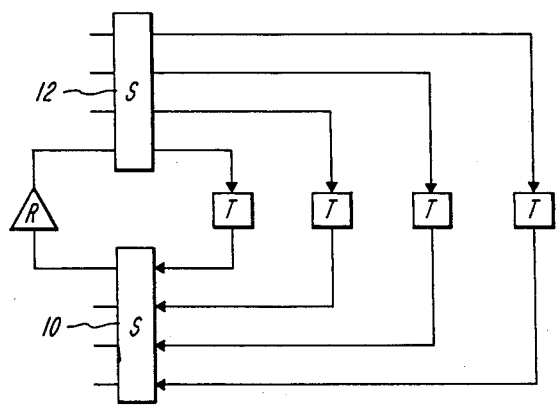
FIG. 3 is a schematic diagram of an active star node of the present invention.

A variety of network configurations to support CSMA/CD protocol have been developed with active stars. In an active star network, some form of repeater function takes place at the star node to compensate for optical power losses. A mechanization of a star network according to the present invention is shown in FIG. 3. In this configuration, a fiber optic star 10 is used to combine the inbound optical signals. The resulting signal is amplified and distributed through a second outbound star 12. This configuration can be mechanized with reflective as well as transmissive stars and is modularly expandable through the application of repeaters. An architecture of this type is the network selected for use in the present invention and requires two optical stars per node. The system is inherently balanced and can be expanded or contracted to meet the immediate needs of the user.

Figure 4:
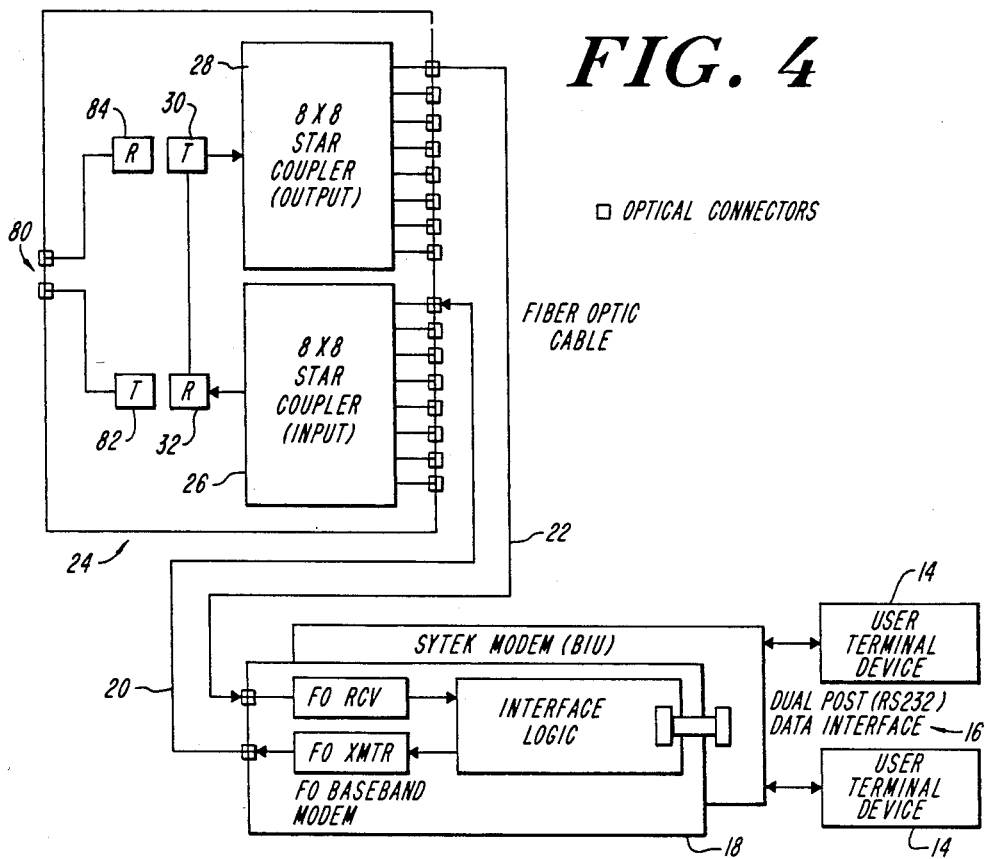
FIG. 4 is a diagram of the local area network elements of the present invention.

The network components of the fiber optic LAN of the present invention are illustrated in FIG. 4. In this implementation, user terminal devices 14 are interfaced to the optical transmission network through a modified Sytek local net 20/100 dual port packet communication unit 16. For operation on a coaxial network, these units contain a communications card (or bus interface unit) and a frequency shift keyed (FSK) RF modem. The communications card includes the firmware for performing the CSMA/CD protocol, data packet formating, and error detection.

In FIG. 4 a fiber optic modem 18 transmits and receives light through a pair of fiber optic cables 20 and 22 connected to an active star or head-end unit 24. The active star node 24 of the LAN consists of two 8×8 passive optical star couplers 26 and 28, an LED transmitter 30, and a PIN photo diode receiver 32. Each of the 8 ports on one side of the star couplers 26 and 28 are dedicated to terminal interconnections. On the other side of the star couplers, one port is terminated through a connector either to the optical receiver 32 or to the optical transmitter 30. Optical transmissions from a terminal 14 enter the input star coupler 26 and are detected by the receiver 32. The electrical output of this receiver 32 drives the head-end transmitter 30, which launches light back into the output star 28. This light is divided by the star 28 and broadcast to all of the terminals. The star node 24 is therefore used unidirectionally. The remaining seven ports of the star couplers are terminated in connectors and may be used as auxiliary ports for additional services. While the star node 24 is shown connected in a head end mode, it should be noted that the node 24 includes an optical expansion port 80 and associated transmitter 82 and receiver 84 which can be switched into electrical connection with the receiver 32 and transmitter 30, respectively, to provide operation in a repeater mode.

All optical sources and detectors used in this implementation operate in the short wavelength range (i.e., around 850 nm). Because collision detection (CD) is used in this implementation (e.g., when the terminals listen for the return of their own start-of-transmission flags), a dual fiber cable is required for interconnectivity between units.

Figure 5:
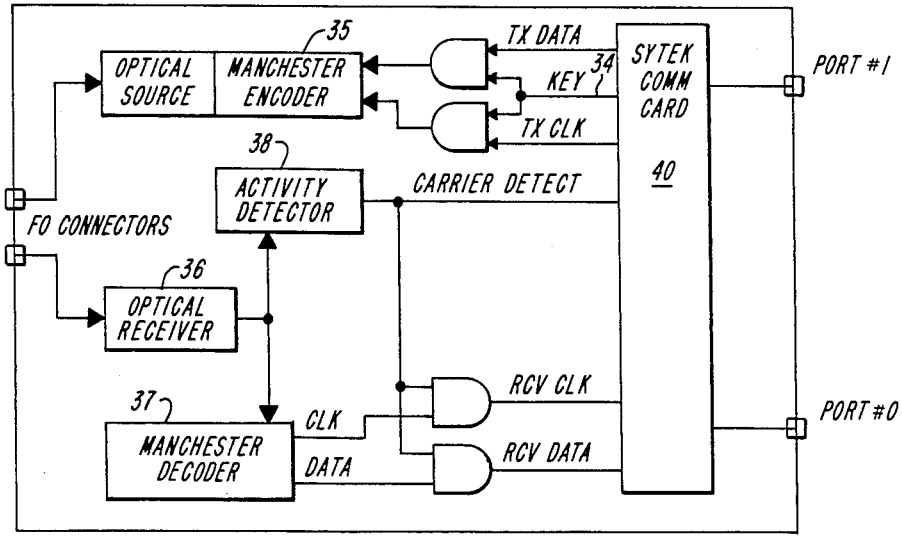
FIG. 5 is a diagram of fiber optic baseband modem logic of the present invention.

The logic to interface the communications card of the Sytek local net 20/100 communication unit 16 to the fiber optic transmission medium is shown in FIG. 5. When the terminal senses that the line is quiet, transmission is achieved by presenting the data to be transmitted to the optical modem together with the carrier key line 34. The carrier key line 34 acts as an enabler and gates the transmit data and clock signals to a Manchester encoder 35 associated with the optical transmitter. The optical signal is transmitted by way of the head-end to all other terminals in the system. Optical energy is detected by an optical receiver 36. The resulting electrical signal is sent to a Manchester decoder 37 to recover data and clock. A portion of the encoded signal is used to stimulate an activity counter 38 that detects the sustained presence of data transmissions. This counter 38 establishes the presence of carrier and is used to gate valid data to the communications card 40.

Figure 6:
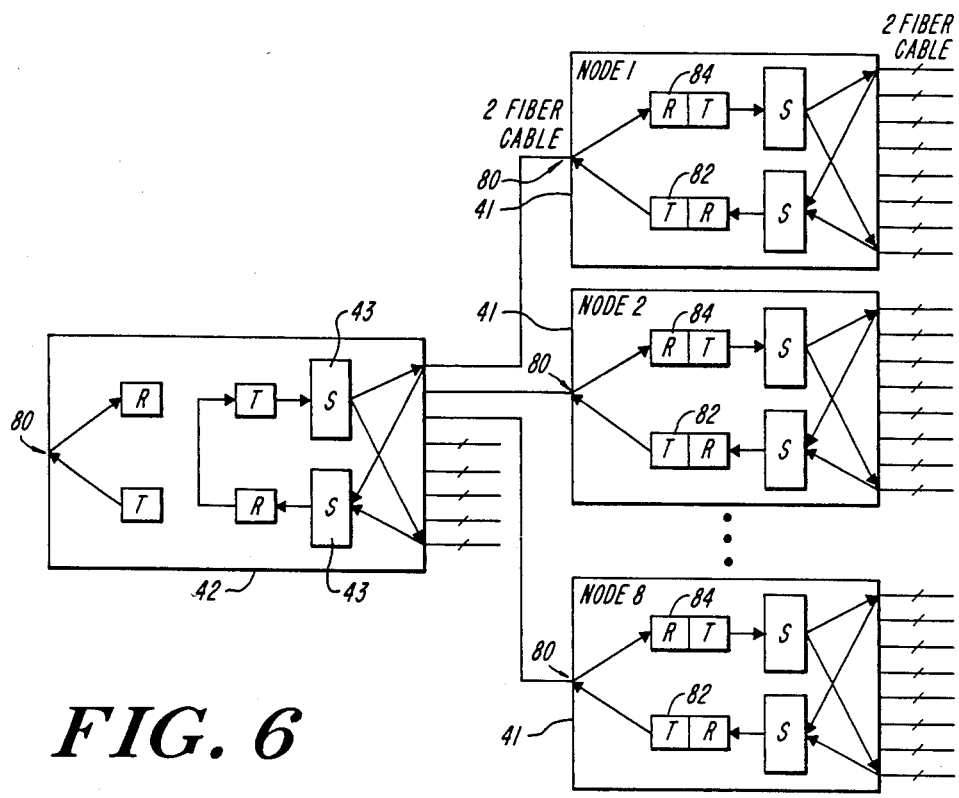
FIG. 6 is a schematic diagram of the modular expansion concepts of the present invention.

To provide connectivity to large subscriber populations, the method of network expansion is illustrated in FIG. 6. Each star node 41 is provided with a switch-selectable mode of operation either to serve as a repeater or to loop back incoming traffic. With the appropriate switch settings, a hierarchy of star nodes is formed. At the lowest level of hierarchy the terminals connect to nodes 41 set for the repeater function. Traffic incident from the terminals is photodetected and then retransmitted via a transmitter 82 and an expansion port 80 toward a higher level. The lower level nodes act as a repeater. The highest level node 42 detects all incoming traffic and then broadcasts this traffic back through the star coupler to all lower order nodes through the expansion ports 80 and the associated receivers 84. The expansion node 42 consists of two pairs of fiber optic transmitter (T) and receiver (R) modules, and a pair of 8×8 star couplers 43.

The expansion concept of FIG. 6 is modular in that all nodes in the system are identical. The optical link budget and dynamic range of an expanded configuration are essentially identical to a single node system since lower order nodes have the same optical configuration as the terminal modems.

An operational single node system may be expanded without interruption of communications if one of the eight terminal ports of a star coupler is dedicated to an expansion. In this case, seven terminals initially operate into a node set for the loop back mode of operation. When expansion is required, a second node (in the repeater mode) is connected to the dedicated expansion port on the original node. For a configuration consisting of N tiers (two tiers are shown in FIG. 6), an optical signal would be regenerated 2N−1 times before final detection in the terminals. The overall system bit error rate (BER) would then be degraded by a factor of approximately 2N compared to the BER of a single optical receiver. A further performance degradation would occur as a result of timing jitter if timing recovery were not employed at the nodes. Timeout periods associated with acknowledgments in the network protocol may impose further limitations. This limitation is determined from propagation delay in the system and is a function of fiber cable lengths and signal regeneration processing delays in the nodes.

Figure 7:
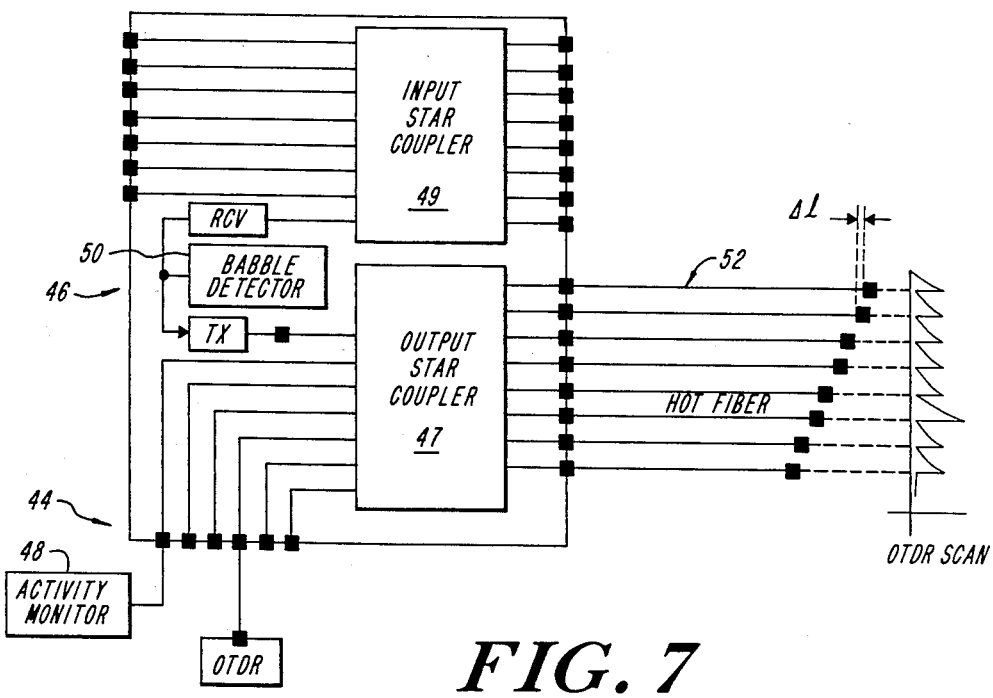
FIG. 7 is a diagram of the technical control capability with the present local area network.

The technical control capability of the present invention will now be described in conjunction with FIG. 7. Technical control refers to monitoring system performance and signaling alert conditions that may result in performance degradation or network failure. As shown in FIG. 7, the auxiliary optical ports 44 on the star node 46 may be used to provide several functions associated with technical control. If the fiber optic node is configured in the loop back mode, so that it functions as the network head-end, all information received from the terminals will appear at the auxiliary ports on the inbound star. An activity monitor 48 connected to one of the ports 44 on the star can provide useful network statistics during operation. The activity monitor 48 consists of an optical detector followed by electronics for decoding packet headers (not shown). By examining incident packet headers, information is obtained on all current virtual connections, and statistics are acquired that can be used to reveal excessive numbers of bad packets, retransmissions, or unexpected disruptions of virtual connections. This information is displayed to a technical controller who initiates corrective maintenance as necessary. A babble detector 50 monitors the incident optical Manchester waveform of the packets. In the event of an optical collision, this waveform will be distorted, but such collision should persist for only a short duration. If a terminal modem malfunctions in the "on" state, and begins to optically jam the network ("babbling"), an excessive collision count is signaled.

Also note that a terminal modem connected to transmit into any of the auxiliary ports 44 on the outbound star 47 and receive on any of the auxiliary ports on the inbound star 49 may communicate with any other terminal on the network. This allows the technical controller to query any of the terminal devices in the network and may be used for fault isolation to a particular terminal.

To monitor the continuity of the fiber optic cable plant, an optical time domain reflectometer (OTDR) may be launced into any one of the auxiliary ports 44. To resolve continuity on each leg of the node, the set of fiber optic cable assemblies 52 is cut to form a sequence of differential lengths Δl. In this manner, reflections from the cable ends are staggered in time and may be resolved with the OTDR.

A video distribution service may also be provided on an unexpanded network by use of the auxiliary ports 44 on the outbound star node 47. Two multiplexing techniques may be considered for this purpose. The first technique is electrical frequency division multiplexing (FDM) in which the video channel is heterodyned by an electrical subcarrier before analog modulation of an optical source. The optical source emits in the same wavelength region as the data sources. The optical analog signal is launched into one of the auxiliary ports 44 on the outbound star 47. This technique differs from conventional FDM approaches in that the RF video and baseband data channels are summed optically instead of electrically. The outbound star coupler, therefore, serves both as a multiplexing summing point and as a branching point for distribution to all users. At the user stations, filtering is performed electrically within the receivers for selecting either the data or the video channel. At the terminal stations, the additional light level from the dc bias of the analog optical source causes an imperfect extinction ratio on data reception; however, no noticeable degradation in data terminal communication is observed.

The second technique is wavelength division multiplexing in which the data and video channel light sources are at distinct wavelengths. The star coupler serves as the wavelength multiplexer. At the expense of optical power margin (or possible cable lengths) a wavelength demultiplexer at the terminal stations separates the data and video wavelengths. In this technique both channels may be baseband modulated. For a multiple video channel transmission, a tunable wavelength demultiplexer may be used to select either the data or any one of the video signals.

Figure 8:
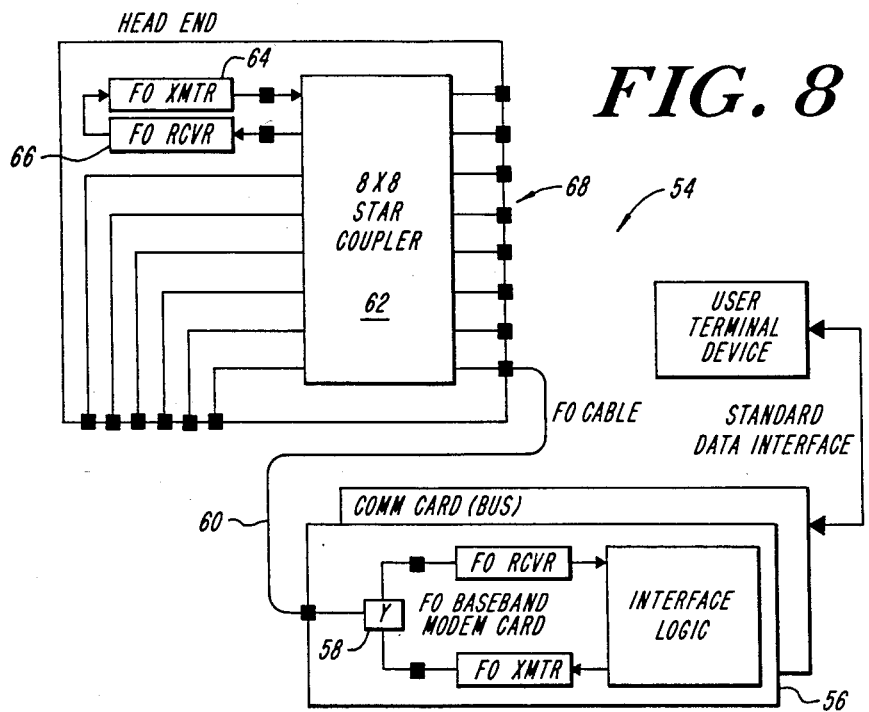
FIG. 8 is a diagram illustrating a bidirectional local area network.

With reference now to FIG. 8, a bidirectional active star network 54 is shown. In this structure, the star node consists of a passive star used for both inbound (combining) and outbound (broadcast) functions. Using the star in this bidirectional manner reduces by half the number of stars required to implement this type of architecture. In FIG. 8, a fiber optic modem card 56 transmits and receives light through a passive "Y" coupler 58 onto a single fiber cable 60. The active star node (or head-end) of the LAN consists of an 8×8 passive optical star coupler 62, an LED transmitter 64 and a PIN photodiode receiver 66. Eight ports on one side of the star coupler 62 are dedicated to terminal interconnections. On the other side of the star coupler 62 one port is terminated, through a connector, to the optical receiver 66, and one port is connected to the transmitter 64. Optical transmissions from a terminal's modem enter the star coupler 62 and are detected by the head-end receiver 66. The electrical output of this receiver drives the head-end transmitter 64, which launches light back into the star coupler 62. This light is divided by the star coupler 62 and broadcast to all terminals 68. The star coupler is therefore used bidirectionally.

All optical sources and detectors used in this implementation operate in the short wavelength range (i.e., around 850 nm). The use of common wavelength bidirectional transmission on a single fiber with an optical "Y" coupler leads to considerations of optical crosstalk from the terminal modem's transmitter to its collocated receiver. Although the isolation of fused biconical tape couplers is greater than 35 dB when the output port is optically terminated, the use of a non-indexed matched connector on the output port gives rise to reflections at the air/glass interfaces of the connector. For an optical "Y" coupler with an excess loss of 0.5 dB, the near end reflections from a connector on the output port result in only 18 dB of optical isolation. In addition, there will be reflections from other connectors in the system and, to a lesser degree, backscatter from the fiber cable and the star coupler. The optical receiver on the terminal modem card 56 will detect this crosstalk. With the implementation of the architecture in FIG. 8, it is not possible because of the single fiber optic cable to "listen while talking".

Figure 9:
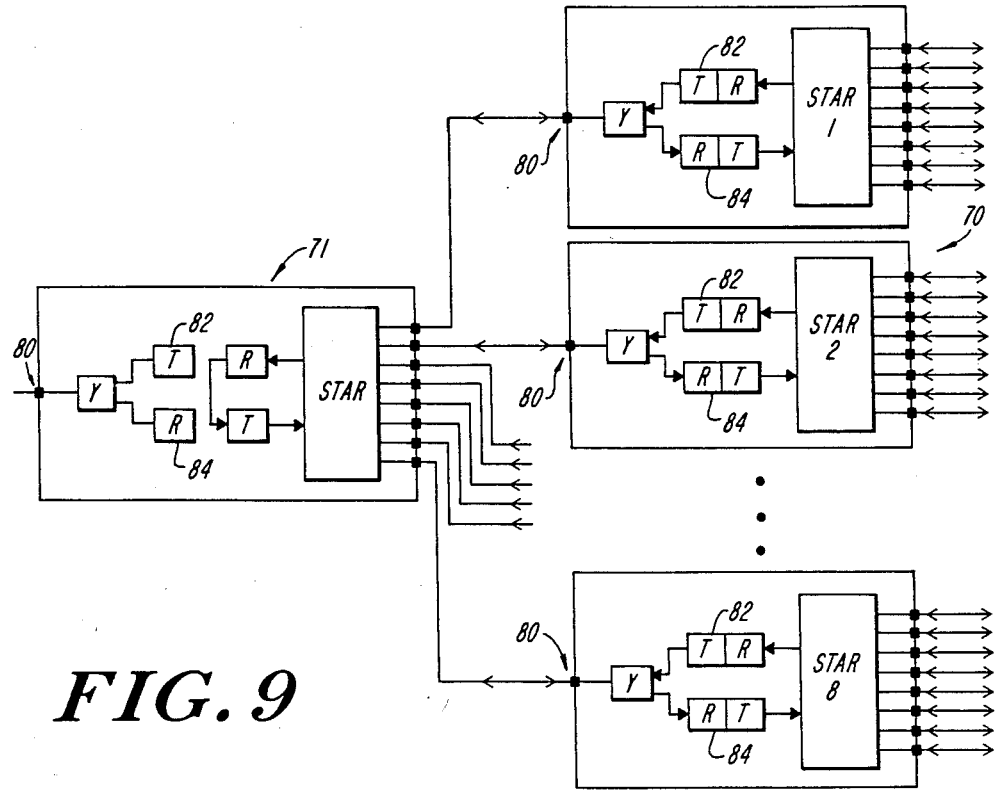
FIG. 9 is a schematic diagram illustrating the modular expansion concept for use with the configuration of FIG. 8.

Modular expansion similar to that shown in FIG. 6 in connection with dual fiber cables, can be achieved with the single fiber embodiment of FIG. 8. This modular expansion concept is shown in FIG. 9. Each of the star nodes 70 is provided with a switch selectable mode of operation to serve either as a repeater or to loop back incoming traffic. With the appropriate switch settings, a hierarchy of star nodes is formed. At the lowest level of the hierarchy the terminals connect to nodes set for the repeater function. Traffic incident from the terminals is photodetected and then retransmitted by a transmitter 82 toward a higher level node 71 on a single fiber through a "Y" coupler feeding an expansion port 80. The lower level nodes act as a repeater. The highest level node 71 detects all incoming traffic and then rebroadcasts this traffic back through the star coupler to all lower order nodes through the expansion port 80 and an associated receiver 80.

Figure 10:
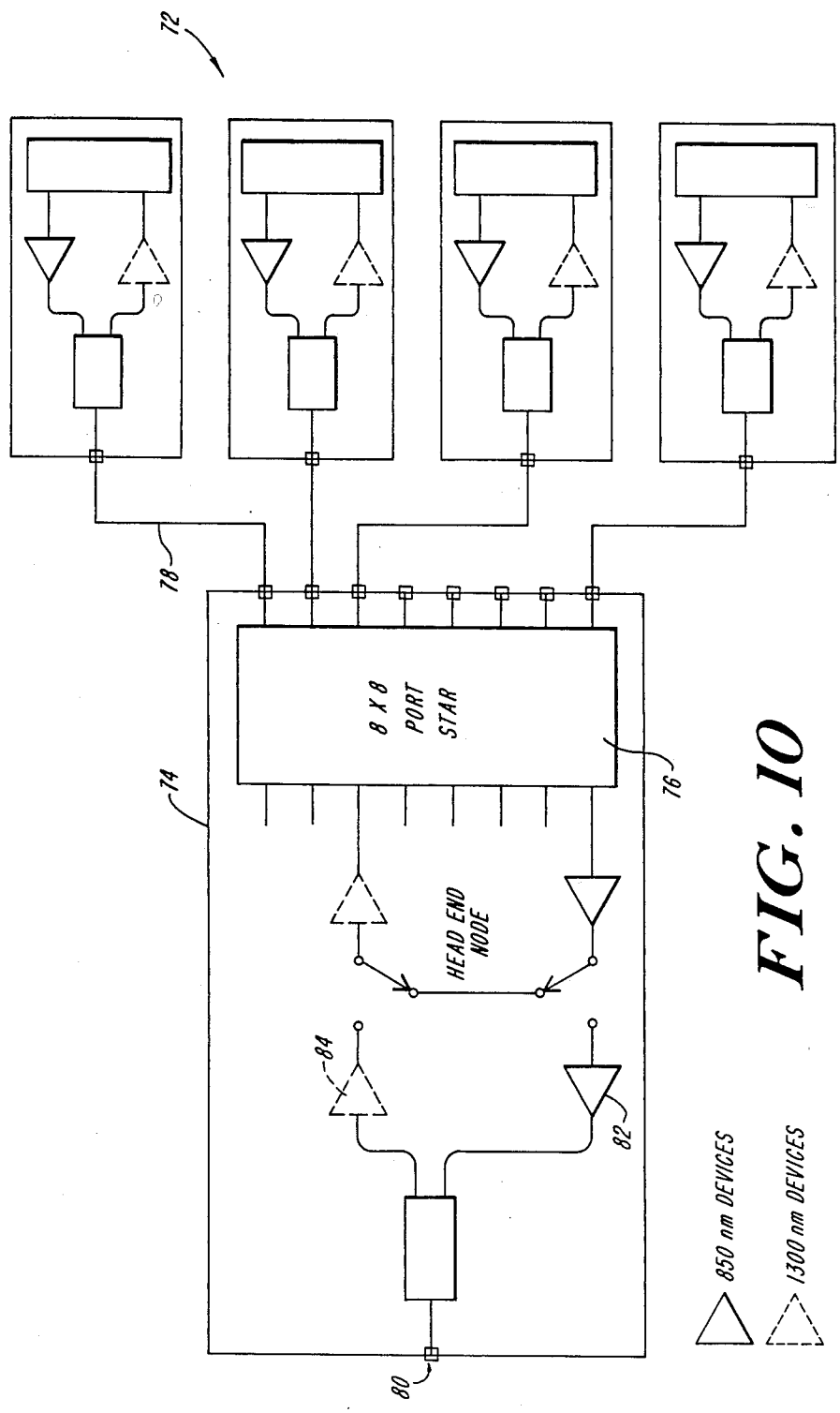
FIG. 10 is a schematic diagram of a dual wavelength bidirectional single fiber local area network.

FIG. 10 shows an embodiment of the present invention capable of "listen while talk" and requiring only a single fiber optic cable. In this case, each of the terminals 72 transmit at one wavelength and receive on another. The architecture of FIG. 10 thus involves bidirectional wavelength division multiplexing (WDM). The head end node 74 in this case would provide the required wavelength translation with the appropriate photodetector and transmitter. In this implementation only one star coupler 76 would be employed in the LAN node and a single fiber 78 would be employed between the LAN node and each terminal 72. The modular expansion scheme described earlier may still be used in this WDM implementation with, for example, short wavelength transmission used on the ascending path from the lower to the higher level nodes, and long wavelength transmission on the descending path.

It is thus seen that the objects of this invention have been achieved in that there has been disclosed a fiber optic local area network architecture based on the use of active star couplers. In one implementation, each star node consists of two star couplers and employs unidirectional fiber optic connections. In another architecture, the active node consists of a single star coupler and a single fiber optic cable is utilized.

The local area networks disclosed herein are portable, flexible and expandable. Growth in the number of network subscribers is modular and additional subscribers can be added to an operating network without interfering with communications between active terminals originally connected to the LAN.

It is recognized that modifications and variations of the present invention will occur to those skilled in the art and it is intended that all such modifications and variations be included within the scope of the appended claims.

What is claimed is:

1. An active star centered optical node for interconnecting a plurality of user terminals comprising:
    at least one passive star coupler including a plurality of first ports for interconnecting the user terminals located at a first side of the star coupler and a like plurality of second ports located at a second, head-end side of the star coupler;
    an optical expansion part located at said second side of the star coupler;
    at least two pairs of optical transmitters and receivers, and,
    selection means movable between a first position which connects said at least two pairs of optical transmitters and receivers in a loop back mode in which an optical input from at least one of said second ports is directed to one of said receivers whose output is directed to one of said transmitters which in turn is directed back to at least one of said second ports and a second position which connects said at least two pairs of optical transmitters and receivers in a repeater mode where the output of at least one of said second ports is directed to the receiver of one of said receiver and transmitter pairs whose transmitter output is directed to said expansion port, and the other of said receiver and transmitter pairs receives an optical signal input to said optical node at said expansion port and transmits it into at least one of said second ports.

2. The active star of claim 1 wherein said selection means is switch-selectable.

3. The active star of claim 1 wherein said at least one passive star coupler is one star coupler and said first and second ports act as both input and output ports for optical information combined or distributed by said passive star coupler.

4. The active star of claim 3 further including a connector which optically connects said expansion port with the transmitter of one of said pairs of transmitters and receivers to produce an output signal at said expansion port that combines the input signals at any of said second ports and with the receiver of the other said pair of transmitters and receivers to produce a multi-channel output at said second ports of a signal input at the expansion port.

5. The active star of claim 1 where said at least passive star comprises a passive input star and a passive output star.

6. A local area optical network comprising:
    a plurality of active star nodes each including:
    (i) at least one passive star having a plurality of ports for interconnecting the terminals, said ports being arrayed both on a terminal side of said passive star and a head-end side of said passive star, (ii) an expansion port disposed at the head-end side of said star, and (iii) two pairs of optical transmitters and receivers located at the head-end side of said star with electrical communication between the optical receivers and transmitters of each said pair and with optical communication via selected ones of said receivers and transmitters between said expansion port and at least one of said ports at the head-end side of said star, said electrical communication being selectable between a first position in which said star node operates in and a second position in which said star node operates in a loop-back mode, said star nodes being arrayed in hierarchical order with a first order in direct connection with the terminals with their expansion ports connected to the ports of a star in a next higher order, the stars in the first order being set in the repeater mode, and the highest order having an active star node set in the loop back mode so that it receives all the optical signals from all levels of the network and re-broadcasts them to all levels of the network.

7. The local area network of claim 6 wherein said at least one star includes a passive input star and a passive output star.

8. The local area network of claim 6 wherein said at least one star includes a single star and the active star is bi-directional.

9. The local area network of claim 6 wherein said transmitters and receivers are switchable between said loop-back and repeater modes so that all of said active stars in said local area optical network are interchangeable.

10. The local area network of claim 6 further comprising at least one interface unit that provides signal transmission between said terminals and said terminal side ports.

* * * * *